US008621211B1

(12) United States Patent
Kishore et al.

(10) Patent No.: US 8,621,211 B1
(45) Date of Patent: Dec. 31, 2013

(54) NETCONF/DMI-BASED SECURE NETWORK DEVICE DISCOVERY

(75) Inventors: Uday Kishore, Bangalore (IN); Roshan Joyce, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 729 days.

(21) Appl. No.: 12/257,587

(22) Filed: Oct. 24, 2008

(51) Int. Cl.
*H04L 9/32* (2006.01)

(52) U.S. Cl.
USPC .......................................... 713/168; 713/171

(58) Field of Classification Search
USPC ................................................. 713/168, 171
See application file for complete search history.

(56) References Cited

U.S. PATENT DOCUMENTS

| | | | | |
|---|---|---|---|---|
| 6,393,386 | B1 * | 5/2002 | Zager et al. | 703/25 |
| 7,062,783 | B1 * | 6/2006 | Joiner | 726/23 |
| 7,240,364 | B1 * | 7/2007 | Branscomb et al. | 726/9 |
| 2006/0112427 | A1 * | 5/2006 | Shahbazi | 726/16 |
| 2006/0212932 | A1 * | 9/2006 | Patrick et al. | 726/11 |
| 2006/0282886 | A1 * | 12/2006 | Gaug | 726/5 |
| 2008/0049642 | A1 * | 2/2008 | Gudipudi et al. | 370/254 |
| 2008/0189774 | A1 * | 8/2008 | Ansari et al. | 726/7 |
| 2008/0209216 | A1 * | 8/2008 | Kelly et al. | 713/169 |

OTHER PUBLICATIONS

"Using the NETCONF Configuration Protocol over Secure SHell (SSH) (RFC4742)" by M. Wasserman et al. (Dec. 2006); 12 pages; originally downloaded from www.ip.com.*
"Performance Analysis of SNMP over SSH" by Vladislav Marinov et al. (2001); 12 pages; originally downloaded from http://www.ietf.org/mail-archive/web/isms/current/pdfsFHFMaj9gL.pdf.*
"Spiceworks 1.5" by Robert P. Lipschutz (May 4, 2007); 3 pages; converted to PDF from http://www.pcmag.com/article2/0,2817,2126163,00.asp.*
"Spiceworks 2.0 Review" by Donald G. Carder (May 25, 2008); 12 pages; originally downloaded from http://lsntap.org/sites/all/files/NTAP%20Spiceworks%20Review.PDF.*
"Spiceworks" by Forever-Autumn.org (Jun. 7, 2008); 4 pages; converted to PDF from http://www.forever-autumn.org/weblog/archives/50.*
"Spiceworks' free IT Desktop provides basic network monitoring for SMBs" by Justin James (Nov. 9, 2006); 3 pages; converted to PDF from http://www.techrepublic.com/article/spiceworks-free-it-desktop-provides-basic-network-monitoring-for-smbs/6134181.*

(Continued)

*Primary Examiner* — Peter Shaw
*Assistant Examiner* — Dao Ho
(74) *Attorney, Agent, or Firm* — Harrity & Harrity, LLP

(57) ABSTRACT

A system receives discovery rule inputs that include addresses, verifies one or more device identifiers for one or more addresses, obtains device information from each verified device associated with the one or more verified device identifiers, determines whether each verified device is a discovered device based on the device information, and automatically adds each verified device as a discovered device to a management system without human intervention when it is determined that the verified device is discovered. The system further creates device configuration information, creates an identifier and password, provides device configuration information, the identifier, and the password, to each of the discovered devices based on the NETCONF or the Device Management Interface standards, waits for a connection from the discovered devices, imports device configuration information from the discovered devices when the connection has been established, and indicates that the discovered devices are managed devices.

17 Claims, 8 Drawing Sheets

(56) References Cited

OTHER PUBLICATIONS

"SSH Public Key Based Authentication—Howto" by Vivek Gite (May 8, 2004); 7 pages; converted to PDF from http://www.cyberciti.biz/tips/ssh-public-key-based-authentication-how-to.html.*

"Hyperic 3.2.2 review" by Phase2.Net (May 22, 2008); 4 pages;converted to PDF from http://www.phase2.net/2008/05/22/hyperic-322-review/ (cached version).*

"Multi-service, Multi-protocol Management for Residential Gateways" by Yvan Royon et al (Dec. 2007); 5 pages; originally downloaded from http://perso.citi.insa-lyon.fr/sfrenot/bib2html/publications/200707-BBEurope-INRIA-NTUA-THOB-v4.pdf.*

"SSH Proxy for JMX" by Prato et al. (Jun. 22, 2006); 1 page; converted to PDF from http://forum.springsource.org/showthread.php?t=26187.*

"Overview of IETF Network Management Activities" (May 2005) by Bert Wijnen; 12 pages; originally downloaded from http://www.itu.int/ITU-T/worksem/ngn/200505/presentations/s4-wijnen.pdf.*

CiscoWorks Campus Manager Tutorial, Release v 4.0, 2005 Cisco Systems, Inc., 228 pages.

Enns, R. (Ed.): "NETCONF Configuration Protocol"; Juniper Networks, Dec. 2006, 85 pages.

Wasserman M. et al.: "Using the NETCONF Configuration Protocol over Secure SHell (SSH)"; ICEsoft Technologies, Inc., Dec. 2006, 9 pages.

Hewlett-Packard Development Company, L.P., "HP OpenView—Network Node Manager Starter Edition 7.0" 6 pages (2003).

IBM Corporation, "IBM Tivoli Network Manager IP Edition", Version 3.8, (2006) 1572 pages.

* cited by examiner

FIG. 8

NETCONF/DMI-BASED SECURE NETWORK DEVICE DISCOVERY

BACKGROUND

Operations, administration, and management (OAM) refers to the processes, tools, standards, etc., involved in operating, administrating and maintaining a system. In a network environment, there may exist a large number of networking devices (e.g., switches, routers, security devices, etc.). However, without up-to-date information, it can be challenging to perform any type of network administration.

Network device discovery is a process in which an inventory of devices associated with a network may be determined. Network administrators may utilize various protocols to facilitate the network discovery process.

SUMMARY

According to one aspect, a method may include receiving discovery rule inputs that include addresses, verifying one or more device identifiers for one or more addresses, obtaining device information from each verified device associated with the one or more verified device identifiers, determining whether each verified device is a discoverable device based on the device information, and automatically adding each verified device as a discovered device to a management system without human intervention when it is determined that the verified device is discoverable.

According to another aspect, a device may include one or more components that may be configured to receive inputs that includes addresses of devices and public key parameters, verify, one or more device identifiers for one or more addresses, perform public key verification for one or more addresses based on the public key parameters, obtain device information for public-key verified devices, determine whether each public-key verified device is a discoverable device based on the device information, and automatically add to the device, each public-key verified device as a discovered device, when it is determined that the public-key verified device is discoverable.

According to another aspect, a computer-readable memory device may have stored thereon instructions, which may be executable by at least one processor. The computer-readable memory device may include one or more instructions for receiving discovery rule inputs that include a range of addresses or subnet masks, one or more instructions for verifying one or more device identifiers associated with the range of addresses or subnet masks, one or more instructions for performing public key verification for one or more devices corresponding to the one or more verified device identifiers, one or more instructions for obtaining device information from the one or more devices that have been public key verified, one or more instructions for determining whether the one or more devices that have been public key verified are discoverable devices based on their device information, and automatically identifying one or more of the one or more devices as one or more discovered devices when it is determined that the one or more of the one or more devices are discoverable.

BRIEF DESCRIPTION OF THE DRAWINGS

The accompanying drawings, which are incorporated in and constitute a part of this specification, illustrate one or more embodiments described herein and, together with the description, explain these embodiments of the invention. In the drawings:

FIG. 8 is a diagram illustrating another exemplary graphical user interface (GUI) provided by the device discovery and management system.

DETAILED DESCRIPTION

The following detailed description refers to the accompanying drawings. The same reference numbers in different drawings may identify the same or similar elements. Also, the following description does not limit the invention.

Overview

The concepts described herein relate to a device discovery and management scheme based on NETCONF/Device Management Interface (DMI) standards. Unlike other device discovery and management schemes, the device discovery and management scheme described herein permits the adding of managed devices automatically, without administrator intervention. That is, typically, in existing device discovery and management schemes, devices are discovered, and then the network administrator will manually add the discovered devices to the network management system. However, in the device discovery and management scheme described herein, the network management system (e.g., NetScreen Security Manager (NSM)) may automatically perform this task.

The device discovery and management scheme may employ Simple Network Management Protocol version 3 (SNMP v3), which supports authentication and password privacy, and provides enhanced security over previous versions of SNMP or other comparable protocols. Additionally, SNMP v3 may be used to filter out specific Internet Protocol (IP) addresses associated with network devices so that such network devices may be automatically added by the NSM. Further, the device discovery and management scheme may employ Secure Shell version 2 (SSH v2), which also provides enhanced security (e.g., fingerprint verification) compared to other protocols, such as, for example, Telnet, or even SSH v1.5. Further, the device discovery and management scheme may be implemented without seed device information (e.g., names and/or addresses of key devices in a network, such as, routers).

Exemplary Environment

Figure 1:
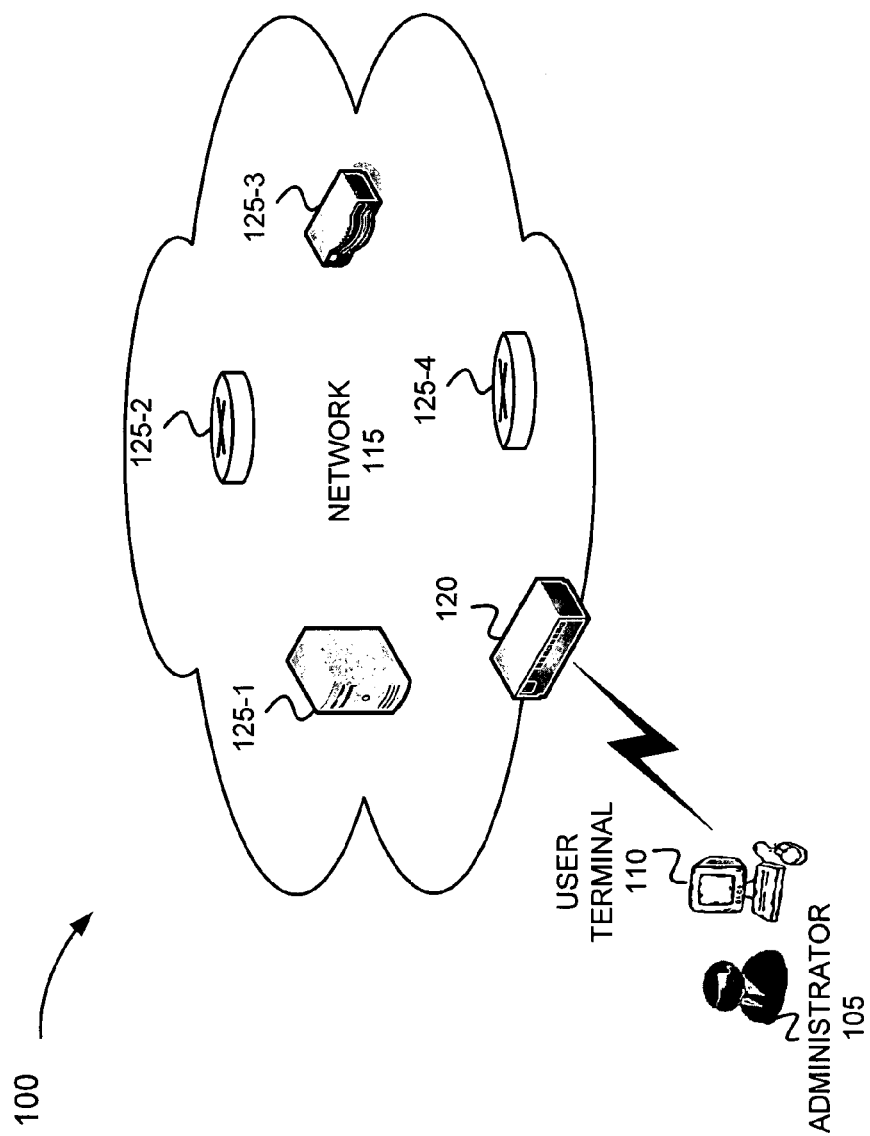
FIG. 1 is a diagram illustrating an exemplary environment in which concepts described herein may be implemented.

FIG. 1 is a diagram illustrating an exemplary environment in which concepts described herein may be implemented. As illustrated in FIG. 1, an exemplary environment 100 may include an administrator 105, a user terminal 110, and a network 115. Network 115 may include a management system 120 and network devices 125-1 through 125-4. Administrator 105 may administer and manage network 115. Administrator 105 may utilize management system 120 via user terminal 110 to perform device discovery and management operations.

User terminal 110 may include a computational device having communication capability. For example, user terminal may include a computer (e.g., a desktop computer, a laptop computer, or a handheld computer).

Network 115 may include any type of network, such as, for example, a local area network (LAN), a wide area network (WAN), a telephone network (e.g., a public switched telephone network (PSTN) or a wireless communications network), the Internet, a private network, etc., or a combination of networks. Network 115 may include various devices that permit communication to take place via a wired and/or wireless media.

Management system 120 may include a device having communication capability. For example, management system 120 may include a router, a bridge, a switch, a gateway, a computer, and/or some other type of device. As will be described below, management system 120 may perform various operations associated with device discovery and management. In one embodiment, a client/server management system may reside on user terminal 110 and management system 120, respectively, to permit device discovery and management. In other embodiments, the management system may reside on a single device.

Network devices 125-1 through 125-4 may each include a device having communication capability. For example, network devices 125-1 through 125-4 may each include a router, a bridge, a switch, a gateway, a computer, a security device (e.g., a firewall), and/or some other type of network device. Network devices 125-1 through 125-4 may include various interfaces and/or support various protocols (e.g., NETCONF, DMI, SNMP, etc.) in accordance with the discovery and management scheme described herein. For purposes of illustration, network device 125-1 may correspond to a computer, network devices 125-2 and 125-4 may correspond to a switch, and network device 125-3 may correspond to a router.

Although FIG. 1 illustrates an exemplary environment 100, in other implementations, environment 100 may include additional, different, or fewer devices than those illustrated in FIG. 1. Thus, it will be appreciated that environment 100 is exemplary in terms of, among other things, the number of devices, the connections between the devices, etc. Additionally, or alternatively, in other implementations, one or more operations described as being performed by a specific device may be performed by, for example, one or more other devices or in combination with the specific device and the one or more other devices. Further, it will be appreciated that operations and/or processes described herein may be performed in a distributed environment where such operations and/or processes may be performed by remote processing devices that are communicatively coupled to environment 100.

Exemplary Device Architecture

Figure 2:
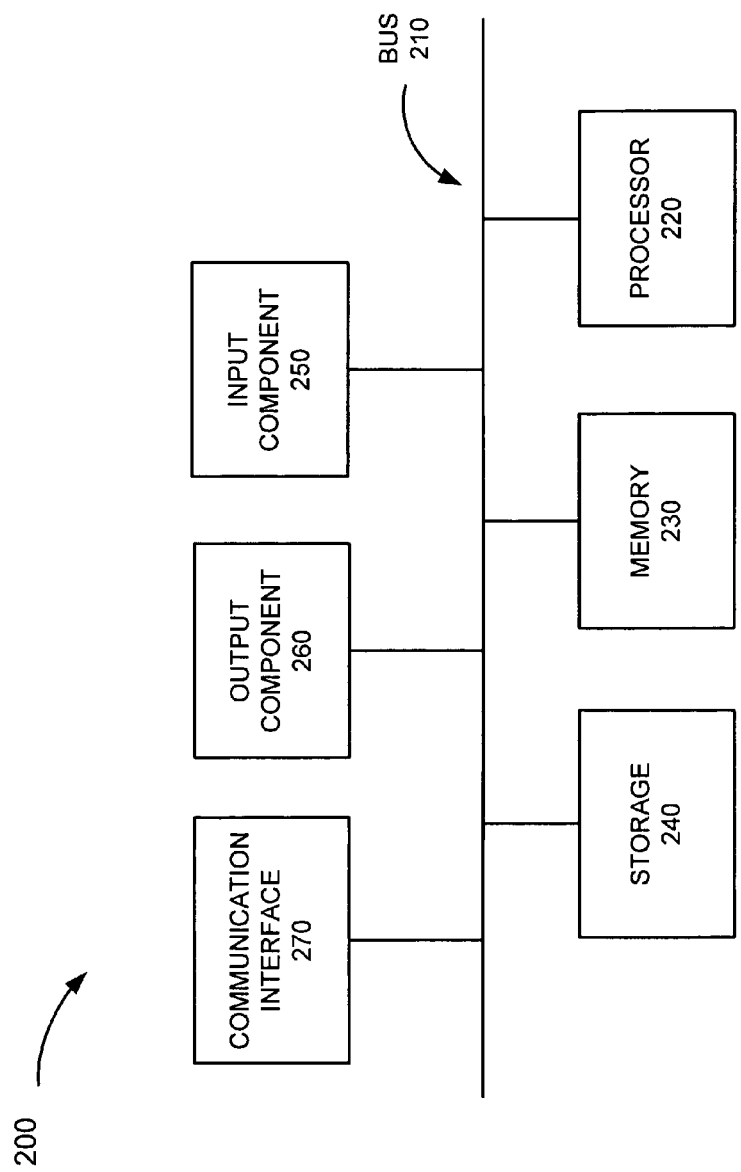
FIG. 2 is a diagram illustrating exemplary components of a device that may correspond to one or more devices depicted in FIG. 1.

FIG. 2 is a diagram illustrating exemplary components of a device that may correspond to one or more devices depicted in FIG. 1 As illustrated, device 200 may include, for example, a bus 210, a processor 220, a memory 230, storage 240, an input component 250, an output component 260, and/or a communication interface 270.

Bus 210 may permit communication among the other components. For example, bus 210 may include a system bus, an address bus, a data bus, and/or a control bus. Bus 210 may also include bus drivers, bus arbiters, bus interfaces, and/or clocks.

Processor 220 may interpret and/or execute instructions and/or data. For example, processor 220 may include a general-purpose processor, a microprocessor, a data processor, a co-processor, a network processor, an application specific integrated circuit (ASIC), a controller, a programmable logic device, a chipset, a field programmable gate array (FPGA), or some other logic device or component that may interpret and/or execute instructions. Processor 220 may control one or more other components.

Memory 230 may store data and/or instructions. For example, memory 230 may include a random access memory (RAM), a dynamic random access memory (DRAM), a static random access memory (SRAM), a synchronous dynamic random access memory (SDRAM), a ferroelectric random access memory (FRAM), a read only memory (ROM), a programmable read only memory (PROM), an erasable programmable read only memory (EPROM), an electrically erasable programmable read only memory (EEPROM), and/or a flash memory.

Storage 240 may store data and/or software applications. For example, storage 240 may include a hard disk (e.g., a magnetic disk, an optical disk, a magneto-optic disk, etc.), a compact disc (CD), a digital versatile disc (DVD), a floppy disk, a cartridge, a magnetic tape, another type of storage medium, or another type of computer-readable medium, along with a corresponding drive. The term "computer-readable medium" is intended to be broadly interpreted to include a physical or a logical memory device.

Memory 230 and/or storage 240 may also include a storing device external to and/or removable from device 200, such as a Universal Serial Bus (USB) memory stick, a hard disk, etc.

Input component 250 may permit input to device 200. For example, input component 250 may permit a user and/or a device to input information. Input component 250 may include, for example, a keyboard, a keypad, a mouse, a button, a switch, a microphone, voice recognition logic, a pen, a port, etc. Output component 260 may permit output from device 200. For example, output component 260 may output information to a user and/or a device. Output component 260 may include, for example, a display, a speaker, one or more light emitting diodes (LEDs), a printer, a port, a vibrator, etc.

Communication interface 270 may include any transceiver-like mechanism that enables device 200 to communicate with other devices and/or systems. For example, communication interface 270 may include an Ethernet interface, an optical interface, a coaxial interface, a wireless interface, or the like.

Although, FIG. 2 illustrates exemplary components of device 200, in other implementations, device 200 may include fewer, additional, and/or different components than those depicted in FIG. 2. In still other implementations, one or more components may perform one or more other operations described as being performed by one or more other components.

Network Management System

Figure 3:
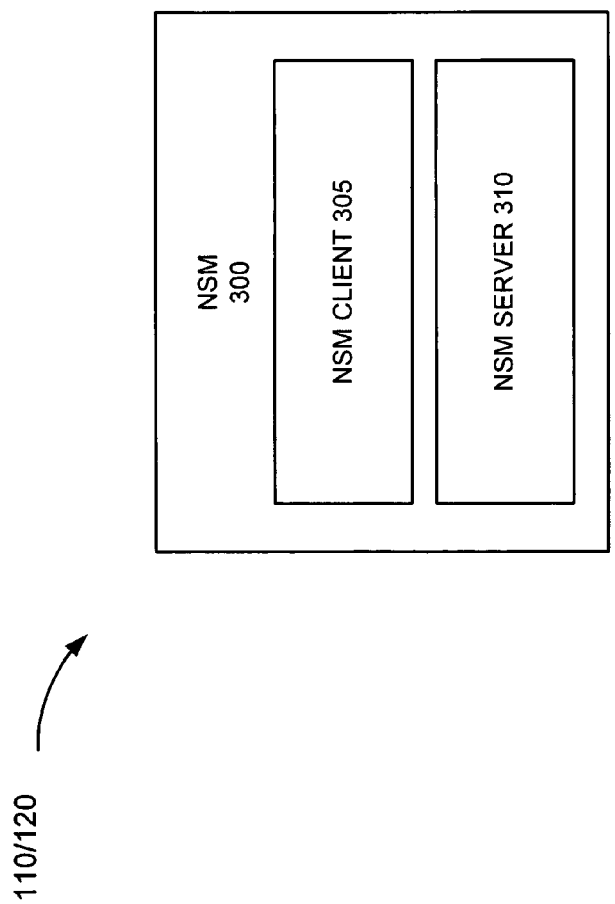
FIG. 3 is a diagram illustrating an exemplary functional component that provides for device discovery and management.

FIG. 3 is a diagram illustrating an exemplary functional component that provides for device discovery and management. As illustrated, NSM 300 may include a NSM client 305 and a NSM server 310. In one embodiment, user terminal 110 may include NSM client 305 and management system 120 may include NSM server 310. In other embodiments, NSM 300 may reside on a single device, such as, for example, management system 120. NSM 300 may be implemented by software executed by one or more processors. In other instances, NSM 300 may be implemented by hardware, firmware, and/or other combinations of components.

NSM client 305 may provide a graphical user interface (GUI) for administrator 105. As will be described below, NSM client 305 may receive input information from administrator 105 and provide state and/or status information to administrator 105 during a device discovery and management process.

NSM server 310 may communicate with network devices 125-1 through 125-4 according to the device discovery and management scheme described herein. NSM server 310 may utilize various protocols (e.g., NETCONF, DMI, SSH v2, SNMP v3, etc.) and automatically perform various operations according to the device discovery and management scheme.

Exemplary Process

Figure 4:
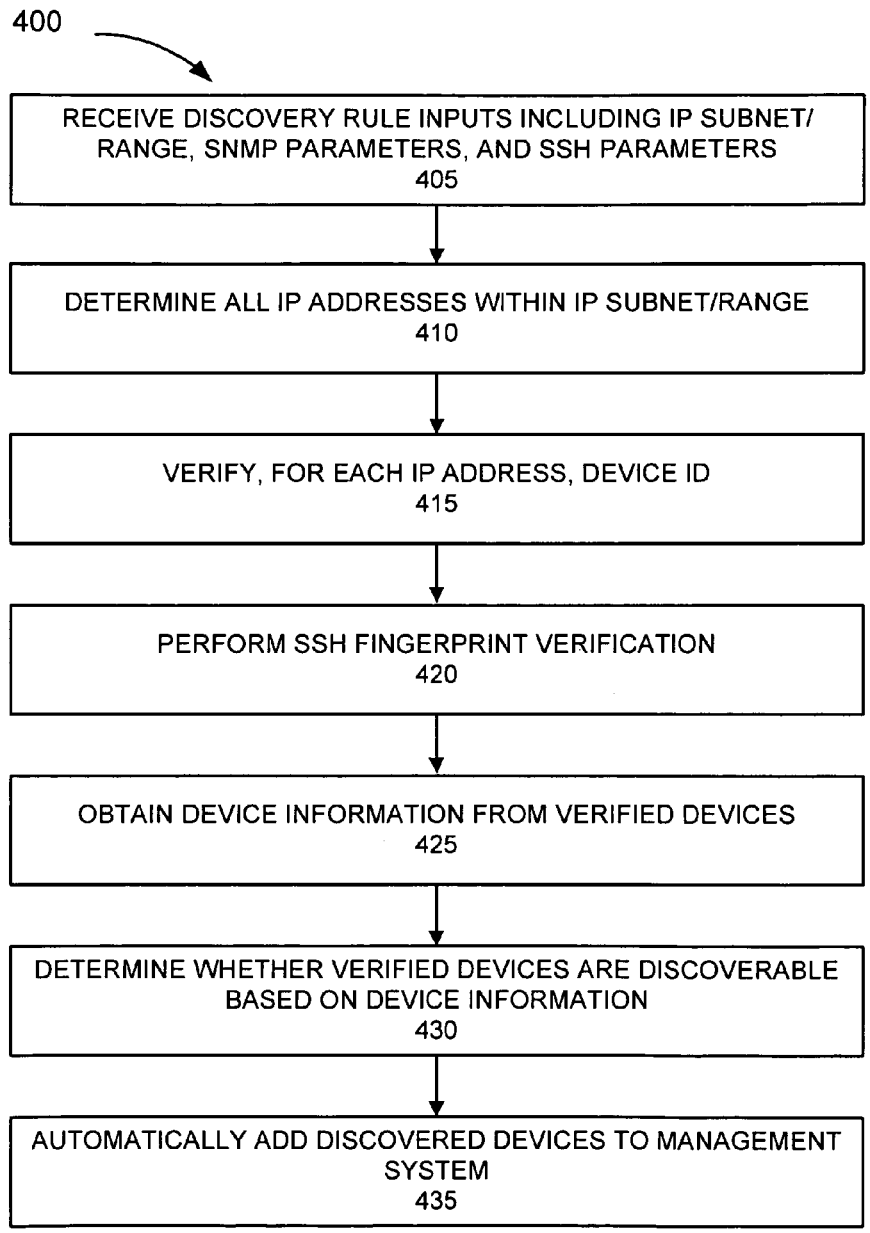
FIG. 4 is a flow diagram illustrating an exemplary process for device discovery.
Figure 7:
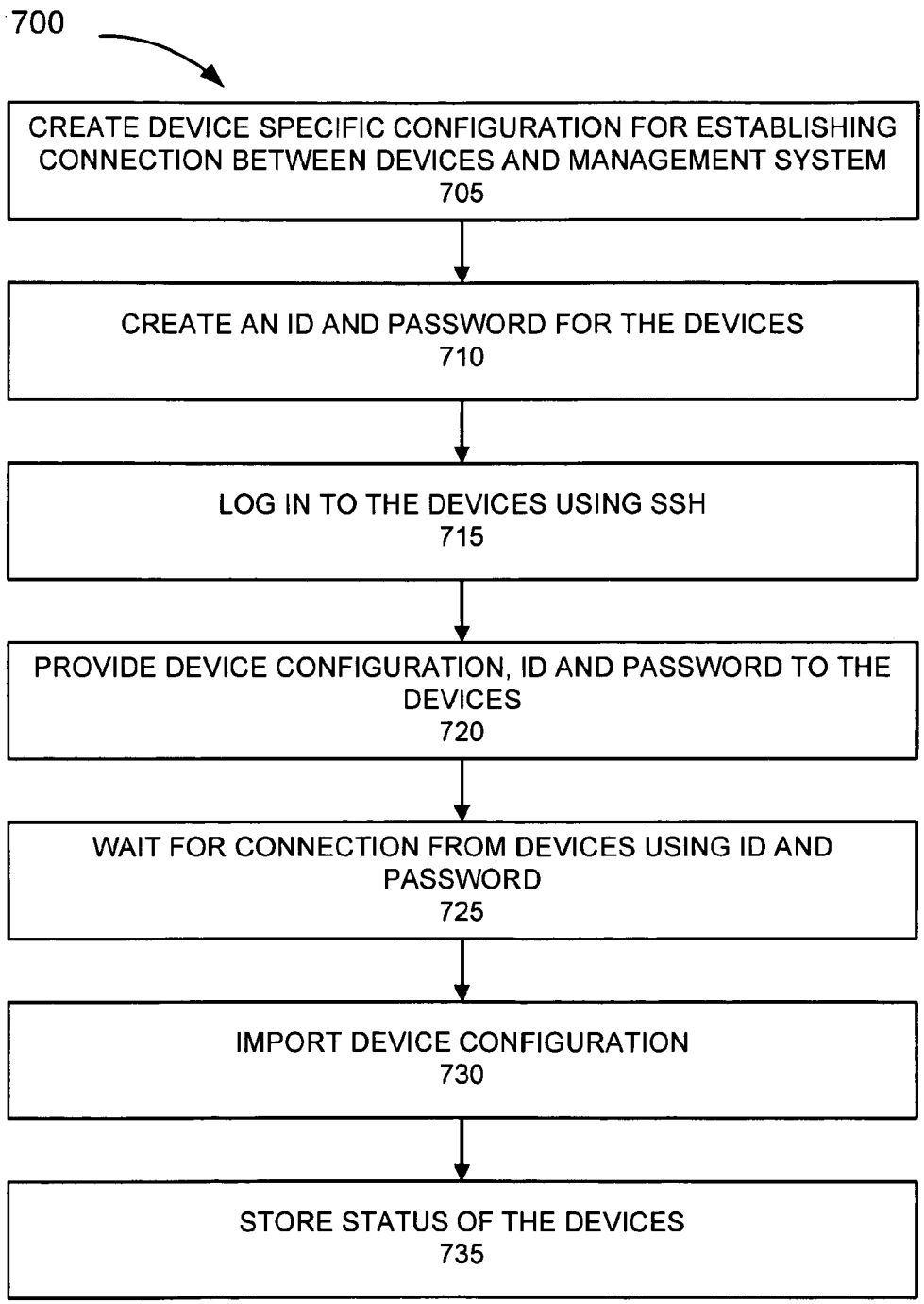
FIG. 7 is a flow diagram illustrating an exemplary process for device management.

FIGS. 4 and 7 are flow diagrams illustrating an exemplary process for device discovery and management. The device discovery and management process will be described in conjunction with other figures.

FIG. 4 is a flow diagram illustrating an exemplary process for device discovery. The device discovery process may be performed by NSM 300. Process 400 may begin with receiving discovery rule inputs that include an IP subnet/range, SSH parameters, and SNMP parameters (block 405). For example, administrator 105 may input into user terminal 110 (e.g., NSM client 305) a range of IP addresses, SSH v2 parameters, and SNMP v3 parameters.

Figure 5:
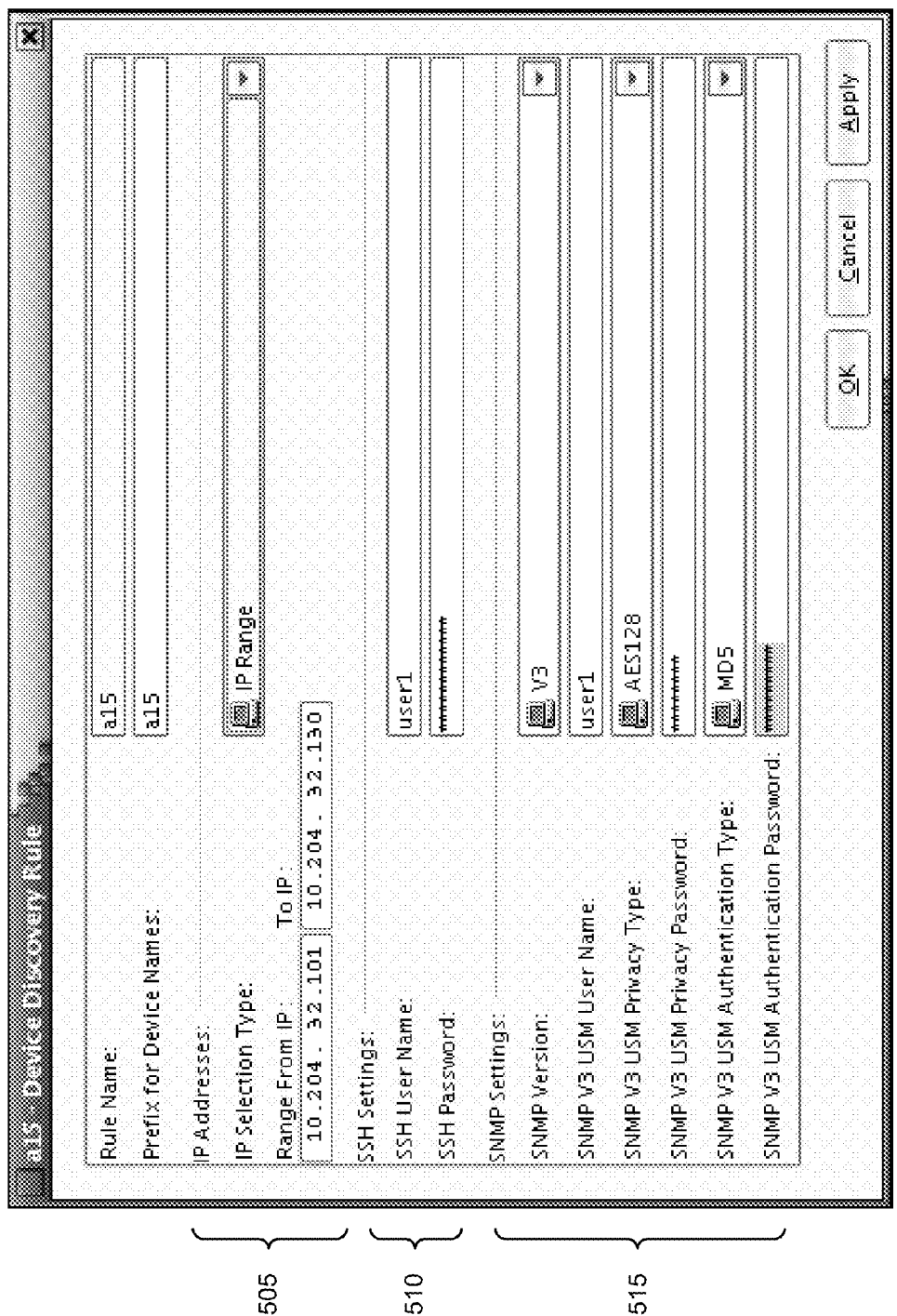
FIGS. 5 and 6 are diagrams illustrating exemplary graphical user interfaces (GUIs) provided by a device discovery and management system.

The IP range may include subnet masks (e.g., an IP subnet). The SSH v2 parameters may include, for example, a user name and password. The SSH v2 parameters may be applicable to each device in the IP range. The SNMP v3 parameters may include parameters related to privacy and authentication. FIG. 5 is a diagram illustrating an exemplary graphical user interface (GUI) provided by NSM 300. Administrator 105 may input the discovery rule into user terminal 110 (i.e., NSM client 305). For example, the GUI may permit administrator 105 to input an IP range of addresses, SSH v2 parameters, and SNMP v3 parameters into fields 505, 510, and 515, respectively.

All of the IP addresses with the IP subnet/range may be determined (block 410). NSM server 310 may generate all of the possible IP addresses with the IP subnet/range. NSM server 310 may utilize these IP addresses for performing discovery for each of the IP addresses. NSM server 310 may filter broadcast addresses, multicast addresses, and/or loop back addresses from the IP address range and/or the IP subnet. NSM server 310 may also filter any addresses known to correspond to devices already discovered and/or managed.

A device ID for each IP address may be verified (block 415). NSM server 310 may ping each device associated with an IP address to determine if the device is active. For example, NSM server 310 may connect to a device using SNMP v3 and retrieve a device ID (e.g., sysObjectID) from the device. NSM server 310 may compare the retrieved device ID to a management information base (MIB) that includes device IDs belonging to a particular enterprise, provider, network, etc. If the device ID is not found in the MIB, NSM server 310 may determine that the device is not to be discovered and/or managed, and proceed to the next IP address. Further, if a ping is non-responsive, NSM server 310 may proceed to the next IP address.

Figure 6:
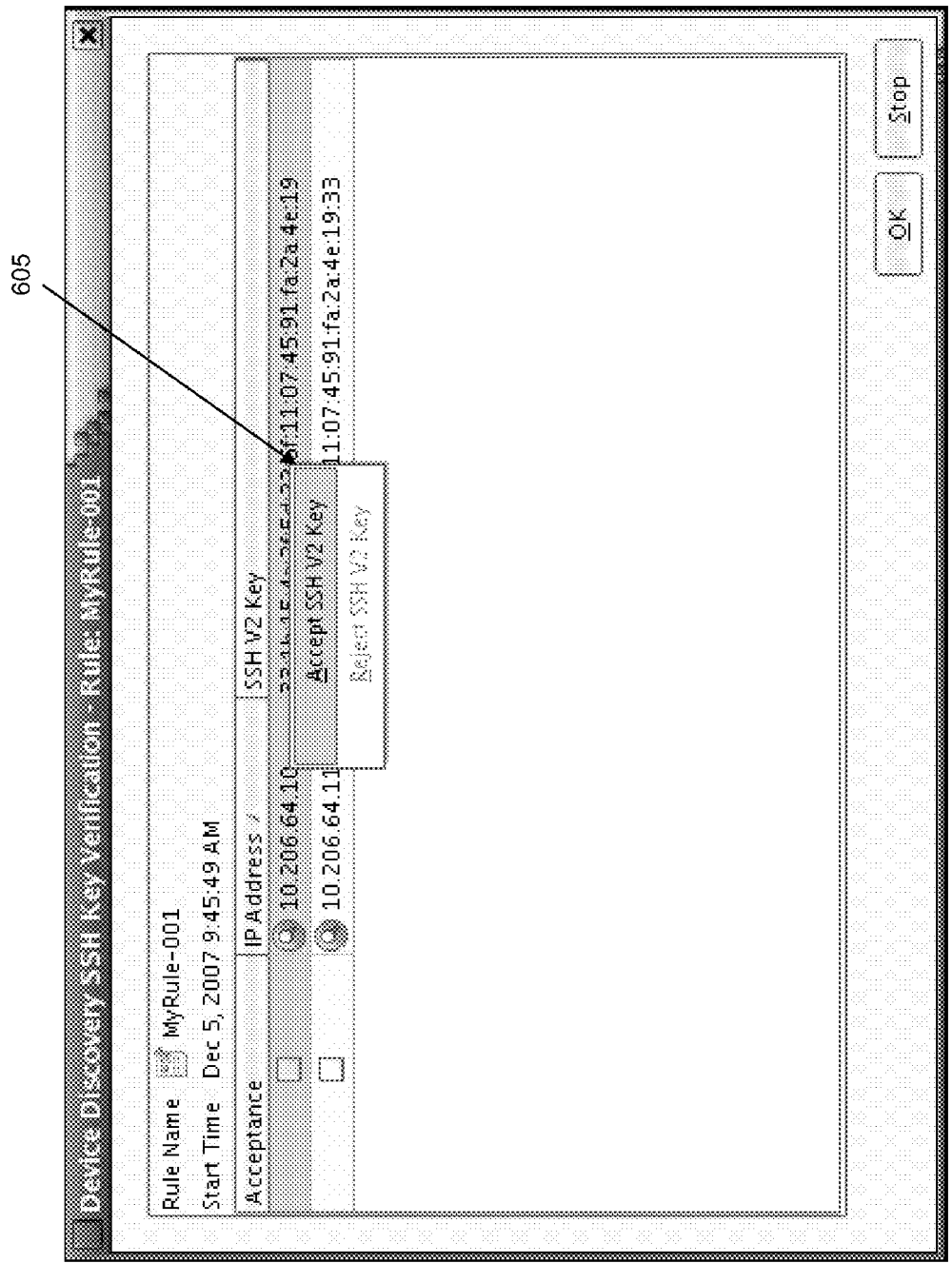

SSH fingerprint verification may be performed (block 420). NSM server 310 may retrieve the SSH v2 fingerprint (i.e., public key) from the device. The retrieved SSH v2 fingerprint may be verified by administrator 105 for authentication purposes. For example, the retrieved fingerprint may be compared to a saved fingerprint accessible to NSM 300. FIG. 6 is a diagram illustrating an exemplary GUI of NSM 300. NSM client 305 may display fingerprint information to administrator 105 to permit acceptance or rejection of the fingerprint information, such as, for example, in field 605.

Device information from verified devices may be obtained (block 425). NSM server 310 may automatically login to each device using SSH v2 credentials. For example, NSM server 310 may utilize NETCONF or DMI (e.g., a GET system information application programming interface (API)) to obtain device information. The device information may include, for example, device family (e.g., router, switch), device platform, device model, and/or device operation system name and version.

A determination may be made whether verified devices are discoverable devices based on device information (block 430). NSM server 310 may determine whether a verified device is a discoverable device based on device information. For example, NSM server 310 may be capable of managing only a subset of devices belonging to an enterprise, provider, and/or network 115. NSM server 310 may identify these devices based on the device information (and device ID). If the device information does not correspond to a discoverable device, NSM server 310 may determine that the device is not capable of being managed.

Automatically add discoverable devices to management system (block 435). NSM server 310 may automatically add these devices as discovered. As will be described below, NSM server 310 may subsequently manage these devices by obtaining device configuration information and/or other inventory information (e.g., hardware, software, etc.).

Although FIG. 4 illustrates an exemplary process 400, in other implementations, fewer, additional, or different operations may be performed. For example, in other implementations, SNMP version 1 (SNMP v1) or community-based SNMP version 2 (SNMP v2c) may be employed. In such instances, a community string may be utilized as a discovery rule input.

A process for managing discovered devices is described below with respect to FIG. 7. Although this process is presented as a separate process, it will be appreciated that the management of the discovered devices is a continuation of process 400 and may be performed as a single process flow. It will be appreciated, under the NETCONF or DMI standards, devices are required to establish connection with the management system (e.g., NSM).

FIG. 7 is a diagram illustrating an exemplary process for device management. The device management process may be performed by NSM 300. Process 700 may begin with creating device specific configurations for establishing a connection from the devices to the management system (block 705). For example, NSM server 310 may provide the devices with configuration information that will trigger the devices to establish a connection with NSM server 310. The configuration information may vary depending on the device. For example, the configuration information may include outbound SSH configuration (e.g., NSM server 310 IP address, port number).

An ID and password for the device may be created (block 710). For example, NSM server 310 may generate an ID and a password for the devices to utilize when logging into NSM server 310. Devices may be logged into using SSH (block 715). For example, NSM server 310 may login to the devices using SSH v2 credentials. Device configuration, ID, and password may be provided to the devices (block 720). For example, NSM server 310 may provide device configuration, ID and password information to the devices. The devices may utilize the ID and password when logging into NSM server 310. NSM server 310 may automatically logoff from the devices once the device configuration, ID, and password information have been provided.

Wait for the establishment of a connection, using the ID and password, from the devices (block 725). For example, NSM server 310 may wait for a connection to be established by the devices. As previously described, the NETCONF and DMI standards are structured such that the devices are to initiate a connection. When a device initiates a connection, NSM server 310 may authenticate the login based on the ID and password.

Device configuration information may be imported (block 730). The devices may provide NSM server 310 with device configuration information so that NSM server 310 can manage the devices. The device configuration information may include, for example, hardware inventory, software inventory, license inventory, device state and configuration information, etc.

Figure 8:
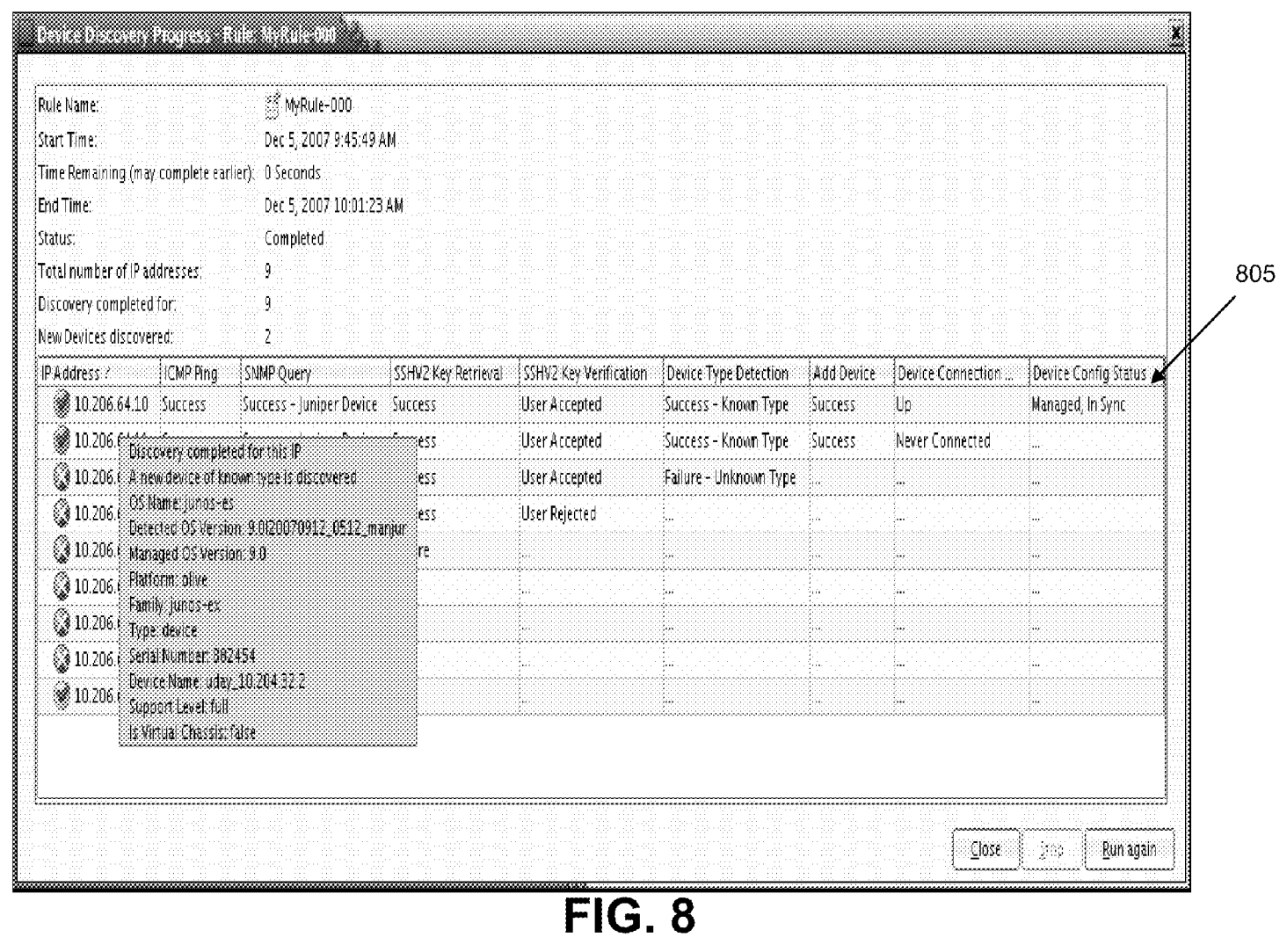

The status of the devices may be stored (block 735). NSM server 310 may store device configuration information and indicate that a device is managed and configurations in sync. FIG. 8 is a diagram illustrating an exemplary GUI of NSM client 305. As illustrated, device configuration status field 805 indicates that a device is managed and in sync.

Although FIG. 7 illustrates an exemplary process 700, in other implementations, fewer, additional, or different operations may be performed.

It will be appreciated that discovery and management operations may proceed on multiple concurrent threads. The maximum number of concurrent threads for each phase, and the time outs that apply in different phases may be configurable through a configuration file in NSM 300. In addition, the administrator may be able to monitor the progress of the discovery and management process via a GUI of NSM client 305.

CONCLUSION

The foregoing description of implementations provides an illustration, but is not intended to be exhaustive or to limit the implementations to the precise form disclosed. Modifications and variations are possible in light of the above teachings or may be acquired from practice of the teachings. For example, discovery and/or management operations may be re-used as schedulable tools to keep configuration and deployment information updated in the management system. Discovery operations may be performed on a scheduled basis and/or based on external events (e.g., an SNMP trap, such as, when a new device is added) from a device already being managed. Further, device discovery may be expanded into topology discovery, since various devices may be discovered, and their relationships (e.g., interconnectivity, routing tables, etc.) may be discovered based on, for example, SNMP MIBs, DMI, and/or Link Layer Discovery Protocol (LLDP) specifications.

In addition, while series of blocks have been described with regard to the processes illustrated in FIGS. 4 and 7, the order of the blocks may be modified in other implementations. Further, non-dependent blocks may be performed in parallel. Further, it may be possible to omit blocks within processes 400 and/or 700.

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

The term "may" is used throughout this application and is intended to be interpreted, for example, as "having the potential to," "configured to," or "being able," and not in a mandatory sense (e.g., as "must"). The terms "a," "an," and "the" are intended to be interpreted to include one or more items. Where only one item is intended, the term "one" or similar language is used. Further, the phrase "based on" is intended to be interpreted as "based, at least in part, on," unless explicitly stated otherwise. The term "and/or" is intended to be interpreted to include any and all combinations of one or more of the associated list items.

Even though particular combination of features are recited in the claims and/or disclosed in the specification, these combinations are not intended to limit the invention. In fact, many of these features may be combined in ways not specifically recited in the claims and/or disclosed in the specification.

No element, block, or instruction used in the present application should be construed as critical or essential to the implementations described herein unless explicitly described as such.

The invention claimed is:

1. A method comprising:
   determining, by a processor, data associated with devices that are manageable by a management system,
      the data identifying:
         one or more brands of the devices that are manageable by the management system, and
         one or more types of the devices that are manageable by the management system;
   receiving, by the processor, discovery rule inputs that include a plurality of network addresses and simple network management protocol (SNMP) parameters;
   filtering, by the processor and based on the SNMP parameters, the plurality of network addresses to remove a first network address of the plurality of network addresses,
      the first network address being associated with the one or more of:
         a broadcast address,
         a multicast address,
         a loop back address, or
         a previously discovered device;
   obtaining, by the processor and based on the discovery rule inputs, information for a network device associated with a second network address, of the plurality of network addresses, that differs from the first network address,
      the information identifying:
         a particular brand associated with the network device, and
         a particular device type associated with the network device;
   determining, by the processor, that the network device is manageable by the management system based on a comparison of the information to the data associated with devices that are manageable by the management system,
      determining that the network device is manageable by the management system including:
         determining that the particular brand, associated with the network device, is included in the one or more brands of the devices that are manageable by the management system, and determining that the particular device type, associated with the network device, is included in the one or more types of the devices that are manageable by the management system; and identifying, by the processor and to the management system, the network device based on determining that the network device is manageable by the management system, the management system obtaining device configuration information associated with the network device and managing the network device using the device configuration information.

2. The method of claim 1, where filtering the plurality of network addresses further comprises:

verifying the plurality of network addresses, where verifying the plurality network addresses includes:

pinging the plurality network addresses using the SNMP parameters;

retrieving, based on pinging the plurality network addresses, device identifiers associated with the plurality network addresses; and verifying the network addresses based on a comparison of the device identifiers to one or more stored device identifiers included in a management information base (MIB) associated with the management system to produce verification results; and discarding one or more of the plurality of network addresses based on the verification results.

3. The method of claim 1, where the discovery rule inputs further include secure shell (SSH) parameters, and where filtering the plurality of network addresses is further based on the SSH parameters.

4. The method of claim 3, where filtering the plurality of network addresses further includes:

retrieving one or more public keys, associated with the plurality of network addresses, based on the SSH parameters;

authenticating the plurality of network addresses based on the retrieved one or more public keys to produce authentication results; and discarding one or more of the plurality of network addresses based on the authentication results.

5. The method of claim 3, where obtaining the information further includes:

logging onto the network device based on the SSH parameters; and obtaining, based on logging onto the device, the information using at least one of a network configuration (NETCONF) protocol or a device management interface (DMI) protocol.

6. The method of claim 5, further comprising:

creating, based on the information, the device configuration information associated with the network device, an identifier, and a password; and providing the device configuration information, the identifier, and the password, to the network device using the at least one of the NETCONF protocol or the DMI protocol, the management system using the device configuration information, the identifier, and the password to manage the network device.

7. The method of claim 6, where creating the device configuration information further includes:

detecting a connection associated with the network device; and determining the configuration information based on the connection.

8. The method of claim 6, where providing the device configuration information, the identifier, and the password includes:

automatically logging on to the one of the devices using secure shell (SSH); and providing, when logged on to the network device, the device configuration information, the identifier, and the password to the network device.

9. A device comprising:

a memory; and one or more processors to:

store, in the memory, data associated with devices that are manageable by a management system, the data identifying:

one or more brands of the devices that are manageable by the management system, and one or more types of the devices that are manageable by the management system;

receive inputs that include addresses, public key parameters, and simple network management protocol (SNMP) parameters that include privacy and authentication parameters;

filter the addresses to remove a first address, of the address, the first address being associated with the one or more of:

a broadcast address, a multicast address, a loop back address, or a previously discovered device;

verify, based on the SNMP parameters, a device identifier associated with a second address included in the filtered addresses, the one or more processors, when verifying the device identifier, being further to:

perform public key verification of the second address based on the public key parameters;

obtain information related to a network device associated with the second address;

determine, based on the information, whether the network device is manageable by the management system, the network device being determined as manageable by the management system when:

a particular brand, associated with the network device, is included in the one or more brands of the devices that are manageable by the management system, and a particular device type, associated with the network device, is included in the one or more types of the devices that are manageable by the management system; and forward, to the management system, the information, the management system using the information to manage the network device.

10. The device of claim 9, where the device includes one of a router, a bridge, a switch, a gateway, a security device, or a computer.

11. The device of claim 9, where the public key parameters correspond to secure shell (SSH) parameters.

12. The device of claim 9, where, when performing the public key verification for the second address, the one or more processors are further to:

receive a user input indicating whether a public key, for the second address, is accepted or rejected, and perform the public key verification for the second address based on the user input.

13. The device of claim 9, where the one or more processors are further to:
automatically log on to the network device, and
provide, to the network device and when logged on to the network devices, an identifier and a password, and
where the identifier and the password enables of the network device to connect with the device, and
where the one or more processors automatically log on to the network device based on a secure shell (SSH) protocol.

14. The device of claim 13, where the one or more processors are further to:
detect a connection between the device and the network device,
receive, when the connection is detected, configuration information for the network device,
store, in the memory, the configuration information for the network device, and
provide the configuration information to the management system,
the management system further using the configuration information to manage the network device.

15. A computer-readable memory device to store instructions, the instructions comprising:
one or more instructions, which when executed by a processor, cause the processor to store data identifying devices that are manageable by a management system, the data including:
first data identifying one or more brands of the devices that are manageable by the management system, and
second data identifying one or more types of the devices that are manageable by the management system;
one or more instructions, which when executed by the processor, cause the processor to receive discovery rule inputs that include at least one of a range of addresses or subnet masks;
one or more instructions, which when executed by the processor, cause the processor to filter the at least one of the range of addresses or the subnet masks to remove at least one of an address or a subnet mask when the at least one of the address or the subnet mask is associated with:
a broadcast,
a multicast,
a loop back, or
a previously discovered device;
one or more instructions, which when executed by the processor, cause the processor to verify one or more device identifiers associated with the filtered at least one of the range of addresses or the subnet masks,
the one or more instructions to verify the one or more device identifiers including:

one or more instructions to verify the one or more device identifiers using simple network management protocol (SNMP);
one or more instructions, which when executed by the processor, cause the processor to perform public key verification for one or more devices corresponding to the one or more verified device identifiers;
one or more instructions, which when executed by the processor, cause the processor to obtain respective information from the one or more devices;
one or more instructions, which when executed by the processor, cause the processor to determine, based on the respective information, whether the one or more devices are manageable by the management system,
one or more instructions to determine whether the one or more devices are manageable by the management system including:
the one or more instructions to determine that a device, of the one or more devices, is manageable by the management system when
a particular brand, associated with the device, is included in the one or more brands of the devices that are manageable by the management system, and
a particular device type, associated with the device, is included in the one or more types of the devices that are manageable by the management system; and
one or more instructions, which when executed by the processor, cause the processor to provide, to the management system, the respective information when the one or more devices are manageable by the management system,
the management system using the respective information to manage the one or more devices.

16. The computer-readable memory device of claim 15, where the one or more instructions to obtain the respective information further comprise:
one or more instructions to obtain, based on the respective information, respective device configuration information from each of the one or more devices using at least one of a network configuration (NETCONF) protocol or a device management interface protocol; and
one or more instructions to provide the respective device configuration information to the management system,
the management system managing the one or more devices further based on the respective device configuration information.

17. The computer-readable memory device of claim 15, further comprising:
one or more instructions to generate login information based on the respective information; and
one or more instructions to authenticate, based on the login information, a login request from the one or more devices.

* * * * *

UNITED STATES PATENT AND TRADEMARK OFFICE
CERTIFICATE OF CORRECTION

PATENT NO.       : 8,621,211 B1
APPLICATION NO.  : 12/257587
DATED            : December 31, 2013
INVENTOR(S)      : Uday Kishore et al.

Page 1 of 1

It is certified that error appears in the above-identified patent and that said Letters Patent is hereby corrected as shown below:

In the Claims

Column 11, claim 13, line 8, following the word "enables" delete "of".

Signed and Sealed this
Twenty-fifth Day of March, 2014

Michelle K. Lee
*Deputy Director of the United States Patent and Trademark Office*